(12) United States Patent
Schmidl

(10) Patent No.: US 9,432,077 B2
(45) Date of Patent: Aug. 30, 2016

(54) DSSS PREAMBLE DETECTION FOR SMART UTILITY NETWORKS

(71) Applicant: Texas Instruments Incorporated, Dallas, TX (US)

(72) Inventor: Timothy Mark Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 57 days.

(21) Appl. No.: 13/762,245

(22) Filed: Feb. 7, 2013

(65) Prior Publication Data

US 2013/0202014 A1    Aug. 8, 2013

Related U.S. Application Data

(60) Provisional application No. 61/596,509, filed on Feb. 8, 2012.

(51) Int. Cl.
*H04B 1/707* (2011.01)

(52) U.S. Cl.
CPC ..................... *H04B 1/707* (2013.01)

(58) Field of Classification Search
CPC ........... G06F 1/26; G06F 17/10; H04B 1/00; H04B 1/06; H04B 1/707; H04B 15/00; H04L 5/12; H04L 23/02; H04L 27/00; H04L 27/06; H04L 27/28; H04W 84/12
USPC ......... 370/336, 338; 375/130, 146–150, 260, 375/342–343; 700/276; 708/300, 315
See application file for complete search history.

(56) References Cited

U.S. PATENT DOCUMENTS

| | | | |
|---|---|---|---|
| 5,909,462 A | 6/1999 | Kamerman et al. | |
| 2001/0032225 A1* | 10/2001 | Tal et al. ........................ | 708/300 |
| 2006/0291541 A1* | 12/2006 | Durand ................ | H04L 7/0079 375/147 |
| 2009/0299532 A1* | 12/2009 | Zyren ........................... | 700/276 |
| 2009/0310653 A1* | 12/2009 | Gorday ......................... | 375/149 |
| 2011/0051612 A1* | 3/2011 | Van Driest ........... | H04B 1/7075 370/252 |
| 2012/0033768 A1 | 2/2012 | Chang et al. | |
| 2012/0127978 A1* | 5/2012 | Wallace et al. ............... | 370/338 |

OTHER PUBLICATIONS

Tanee Demeechai, "An Efficient Receiver Scheme for IEEE 802.15.4 BPSK Systems", 9th International Symposium on Communications and Information Technology, 2009, Sep. 28-30, 2009, Incheon, Korea, pp. 1446-1449.

(Continued)

*Primary Examiner* — Sam K Ahn
*Assistant Examiner* — Shawkat M Ali
(74) *Attorney, Agent, or Firm* — Lawrence J. Bassuk; Frank D. Cimino

(57) ABSTRACT

Embodiments of the invention provide a method to detect DSSS preambles in smart utility networks. A DSSS signal is received by a receiver and a digital sequence of samples is formed. A difference value is calculated between pairs of samples in the digital sequence of samples to form a sequence of differential values. A known preamble differential value sequence is correlated with the sequence of differential values to form a sequence of correlation values. A location of the preamble is located in the digital sequence of samples corresponding to a peak in the sequence of correlation values that exceeds a threshold value.

14 Claims, 13 Drawing Sheets

(56) References Cited

OTHER PUBLICATIONS

Sumeeth Nagaraj et al, "On Preamble Detection in Packet-Based Wireless Networks", 2006 IEEE Ninth International Symposium on Spread Spectrum Techniques and Applications, Aug. 28-31, 2006, Amazon, Brazil, pp. 476-480.

"IEEE Standard for Local and Metropolitan Area Networks—Part 15.4: Low-Rate Wireless Personal Area Networks (LR-WPANs) Amendment 3: Physical Layer (PHY) Specifications for Low-Data-Rate, Wireless, Smart Metering Utility Netwoks", IEEE Std 802.15.4g-2012 (Amendment to IEEE std 802.15.4-2011), Apr. 27, 2012, New York, NY, pp. 1-252.

\* cited by examiner

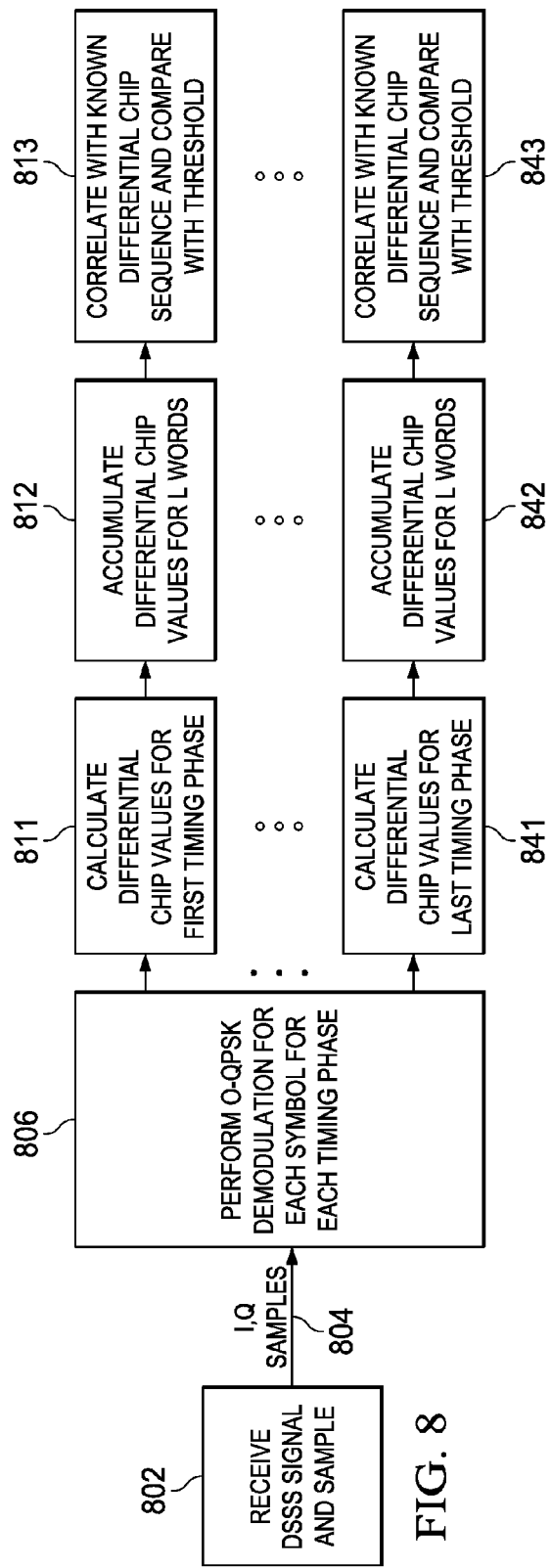
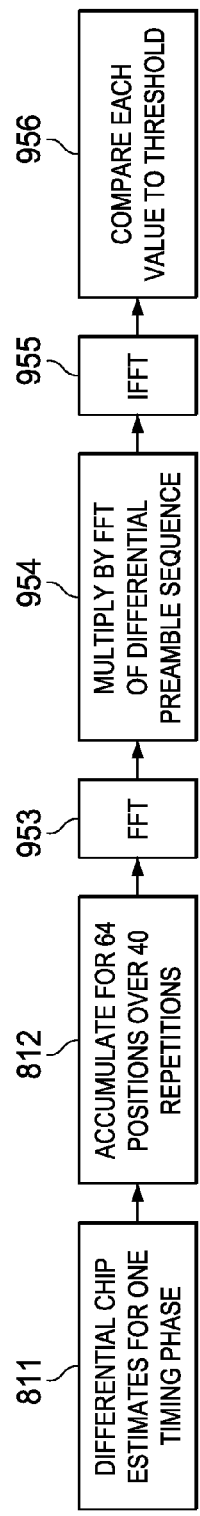
FIG. 8
FIG. 9

DSSS PREAMBLE DETECTION FOR SMART UTILITY NETWORKS

CLAIM OF PRIORITY UNDER 35 U.S.C. 119(e)

The present application claims priority to and incorporates by reference U.S. Provisional Application No. 61/596,509, filed Feb. 8, 2012, entitled "Efficient DSSS Preamble Detection For Smart Utility Networks."

FIELD OF THE INVENTION

Embodiments of the invention are directed, in general, to smart utility networks systems and, more specifically, preamble detection for smart utility networks.

BACKGROUND OF THE INVENTION

A smart utility network (SUN) is a low rate (40 kb/s to 1 Mb/s), low power wireless technology that is specifically designed to be used in utility metering applications, such as transmitting electric, gas, or water usage data from the meter(s) on the customer premises to a data collection point (hub) operated for the utility. For example, meters could be installed for each house in a residential neighborhood, and then the data could be sent every 15 minutes from each meter to a pole-top data collection point. This data collection point could then be connected by fiber, copper wire, or wireless to a central office which collects all the data for a region. Data could either be sent directly from each meter to the collection point (star configuration), or it could be hopped from meter to meter until it reaches the collection point (mesh configuration).

There are different physical layers (PHYs) that can be used for a SUN including FSK (frequency shift keying), DSSS (direct sequence spread spectrum), and OFDM (orthogonal frequency division multiplexing). In a closed utility network the devices that are allowed into the network can be controlled by the utility or the network operator.

IEEE (Institute of Electrical and Electronics Engineers) 802.15 is a working group of the IEEE 802 standards committee which specifies Wireless Personal Area Network (WPAN) standards. IEEE 802.15.4 is a standard that specifies the physical layer and media access control for low-rate wireless personal area networks (LR-WPANs). It is the basis for the ZigBee, ISA100.11a, WirelessHART, and MiWi specifications, each of which further extends the standard by developing the upper layers which are not defined in IEEE 802.15.4. Alternatively, it can be used with 6LoWPAN (Internet Protocol version 6 low power wireless personal area network) and standard Internet protocols to build a wireless embedded Internet. The IEEE 802.15.4 g standard is commonly referred to as the Smart Utility Network (SUN) and is a physical layer (PHY) amendment to the existing low power, personal area network 802.15.4 standard. IEEE 802.15.4 g is intended to provide a global standard that facilitates very large scale process control applications such as the utility smart-grid network capable of supporting large, geographically diverse networks with minimal infrastructure, with potentially millions of fixed endpoints.

A SUN network can be set up in a mesh configuration where devices can communicate with neighbor devices rather than just with a hub. This helps to increase coverage since communication can be achieved even if the link directly to the hub is not good. However, this can increase the amount of traffic that goes through some devices since they have to include packet data from their neighbors as well as their own data. A mesh network can be appropriate for an urban or suburban area with a high density of meters and non-line-of-sight conditions between meters so that communication links between some meters and a hub is poor.

A star configuration is one where a hub communicates directly with each meter. This could be appropriate for rural environments when the density of meters is low so that there may not be a convenient neighbor to use as an intermediate hop. A mix between a star and mesh configuration can also be used in some deployments.

In a one-way system, readings "bubble up" from end devices (such as meters), through the communication infrastructure, to a "master station" which publishes the readings. A one-way system might be lower-cost than a two-way system, but also is difficult to reconfigure should the operating environment change.

In a two-way system, both outbound and inbound traffic is supported. Commands can be broadcast from a master station (outbound) to end devices, such as meters, that may be used for control and reconfiguration of the network, to obtain readings, to convey messages, etc. The device at the end of the network may then respond (inbound) with a message that carries the desired value. Outbound messages injected at a utility substation will propagate to all points downstream. This type of broadcast allows the communication system to simultaneously reach many thousands of devices. Control functions may include monitoring health of the system and commanding power shedding to nodes that have been previously identified as candidates for load shed. PLC (power line communication) also may be a component of a Smart Grid.

In packetized communication systems, packet arrival instants are generally random and unknown at the receiver. The payload can be successfully demodulated provided the receiver has symbol timing, frequency and phase offset information, in addition to achieving frame synchronization. In many practical applications, these parameters are not known a priori at the receiver and hence have to be estimated from the received signal. IEEE 802.15.4 g uses a DSSS preamble at the beginning of each DSSS packet.

The radio frequency channel can be very hostile. Channel characteristics and parameters can vary with frequency, location, time, and with radio interference from other devices.

Since meters have a long life span such as 20 years, there may be many generations of meters deployed in a utility network. The earlier deployed meters can be termed as legacy equipment. Therefore, smart meters using newer technology may need to co-exist with legacy devices. For example, the legacy devices in a utility network may communicate using FSK (frequency shift keying) modulation, often at a fixed data rate such as 50 kb/s, 100 kb/s or 150 kb/s.

BRIEF DESCRIPTION OF THE DRAWINGS

Particular embodiments in accordance with the invention will now be described, by way of example only, and with reference to the accompanying drawings:

FIGS. 8-9 are flow diagrams illustrating detection of DSSS preambles using differential sequences;

Figure 1:
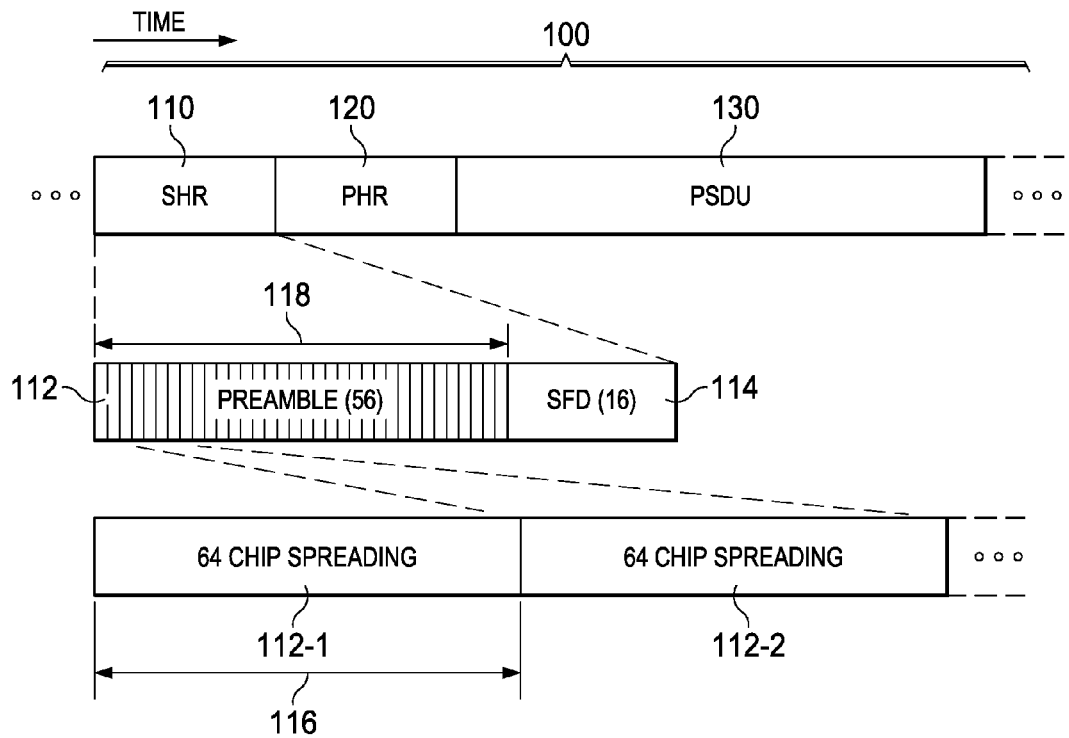
FIG. 1 is an illustration of a DSSS physical layer packet.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Schemes for detecting a preamble in a direct sequence spread spectrum (DSSS) signal are disclosed herein. In one embodiment, a DSSS signal is received and digitally sampled. The sampled DSSS signal is demodulated to form a sequence of chip values. A phase difference value is calculated between each pair of consecutive chip values in the sequence of chip values to form a sequence of differential chip values. A known preamble differential chip sequence may then be correlated with the sequence of differential chip values to form a sequence of correlation values. A location of a preamble in the sequence of differential chip values may be identified as corresponding to a peak in the sequence of correlation values that exceeds a threshold value.

Correlation of the known preamble and the sequence of differential chip values may be done in the frequency domain by accumulating a sequence of differential values having a length greater than a multiple of the known preamble differential chip sequence; calculating a Fast Fourier Transform (FFT) of the accumulated sequence of differential values; multiplying by a FFT of the preamble differential chip sequence; and determining an inverse FFT (IFFT).

Correlation of the known preamble and the sequence of differential chip values may also be done by performing a convolution in the time domain.

FIG. 1 is an illustration of a DSSS (direct sequence spread spectrum) physical layer packet 100 as defined by the IEEE 802.15.4 g specification, which is incorporated by reference herein. DSSS packet 100 includes a synchronization header (SHR) 110, a physical layer header (PHR) 120, and a physical layer service data unit (PSDU) 130. Each synchronization header contains a preamble 112 and a start frame delimiter (SFD) 114. For the 1000 kchip/s mode, the preamble contains 56 bits that are spread with spreading code of length 64 to form 56 repetitions of a 64 chip preamble sequence, as indicated at 112-1, 112-2 for example. The SFD 114 contains sixteen bits that are also spread with a spreading code of length 64. Table 1 summarizes the various bands supported by IEEE 802.15.4 g along with the associated SHR coding and spreading parameters. A MAC (media access control) header, payload, and CRC (cyclic redundancy check) are all contained within the PSDU 130. Embodiments of the invention provide a low complexity approach to detect each DSSS preamble 112, as described in more detail below.

TABLE 1

SHR coding and spreading parameters

| Frequency band (MHz) | Chip rate (kchip/s) | BDE | Spreading |
| --- | --- | --- | --- |
| 470-510 | 100 | yes | $(32, 1)_0$-DSSS |
| 779-787 | 1000 | yes | $(64, 1)$-DSSS |
| 868-870 | 100 | yes | $(32, 1)_0$-DSSS |
| 902-928 | 1000 | yes | $(64, 1)$-DSSS |
| 917-923.5 | 1000 | yes | $(64, 1)$-DSSS |
| 920-928 | 100 | yes | $(32, 1)_{0/1}$-DSSS |
| 950-958 | 100 | yes | $(32, 1)_0$-DSSS |
| 2400-2483.5 | 2000 | yes | $(128, 1)$-DSSS |

Figure 2:
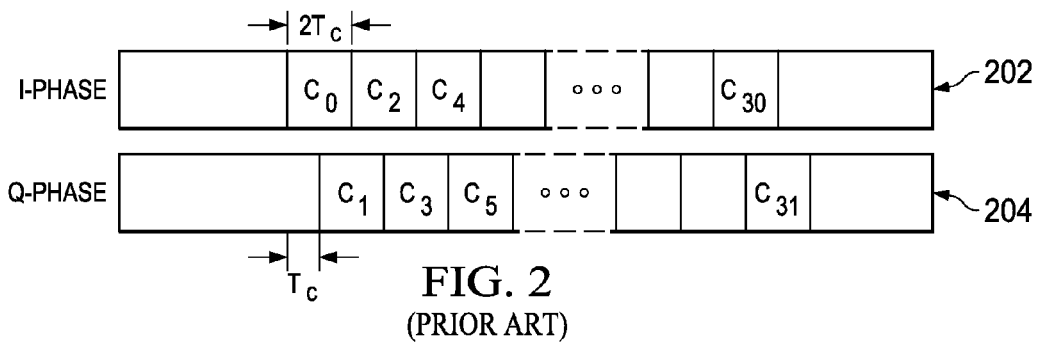
FIG. 2 is timing diagram illustrating offset QPSK modulation.

FIG. 2 is timing diagram illustrating offset QPSK modulation. The DSSS PHY (physical layer) uses offset QPSK (quadrature phase shift keying) (O-QPSK) modulation with a chip rate of either 100 kchip/s, 1000 kchip/s, or 2000 kchip/s. The term offset means that the in-phase (I) channel 202 and quadrature (Q) channel 204 are offset by half of a chip time $T_C$. IEEE 802.15.4 g defines several transmission rate modes. For the 1000 kchip/s mode, there is a preamble of 56 zeros with each bit spread by a spreading code of length 64, which results in repeating pattern during the preamble with a repetition rate of 64 microseconds, as illustrated at 116, referring again to FIG. 1. This also results in a preamble of length 3584 microseconds, as illustrated at 118. For the 2000 kchip/s mode, there is a preamble of 56 zeros with each bit spread by a spreading code of length 128. This results in a preamble of length 3584 microseconds with a repetition period of 64 microseconds. For the 100 kchip/s mode, there is a preamble of 32 zeros with each bit spread by a spreading code of length 32. This results in a preamble of length 10240 microseconds with a repetition period of 320 microseconds.

A chip is a pulse of a direct-sequence spread spectrum (DSSS) code. The chips are just the bit sequence that is produced by a code generator; but they are called chips to avoid confusing them with message bits. The chip rate of a code is the number of pulses per second (chips per second) at which the code is transmitted (or received). The chip rate is larger than the bit rate, meaning that one bit is represented by multiple chips. The ratio of the chip rate to the bit rate is known as the spreading factor (SF) or spreading code length.

Figure 3:
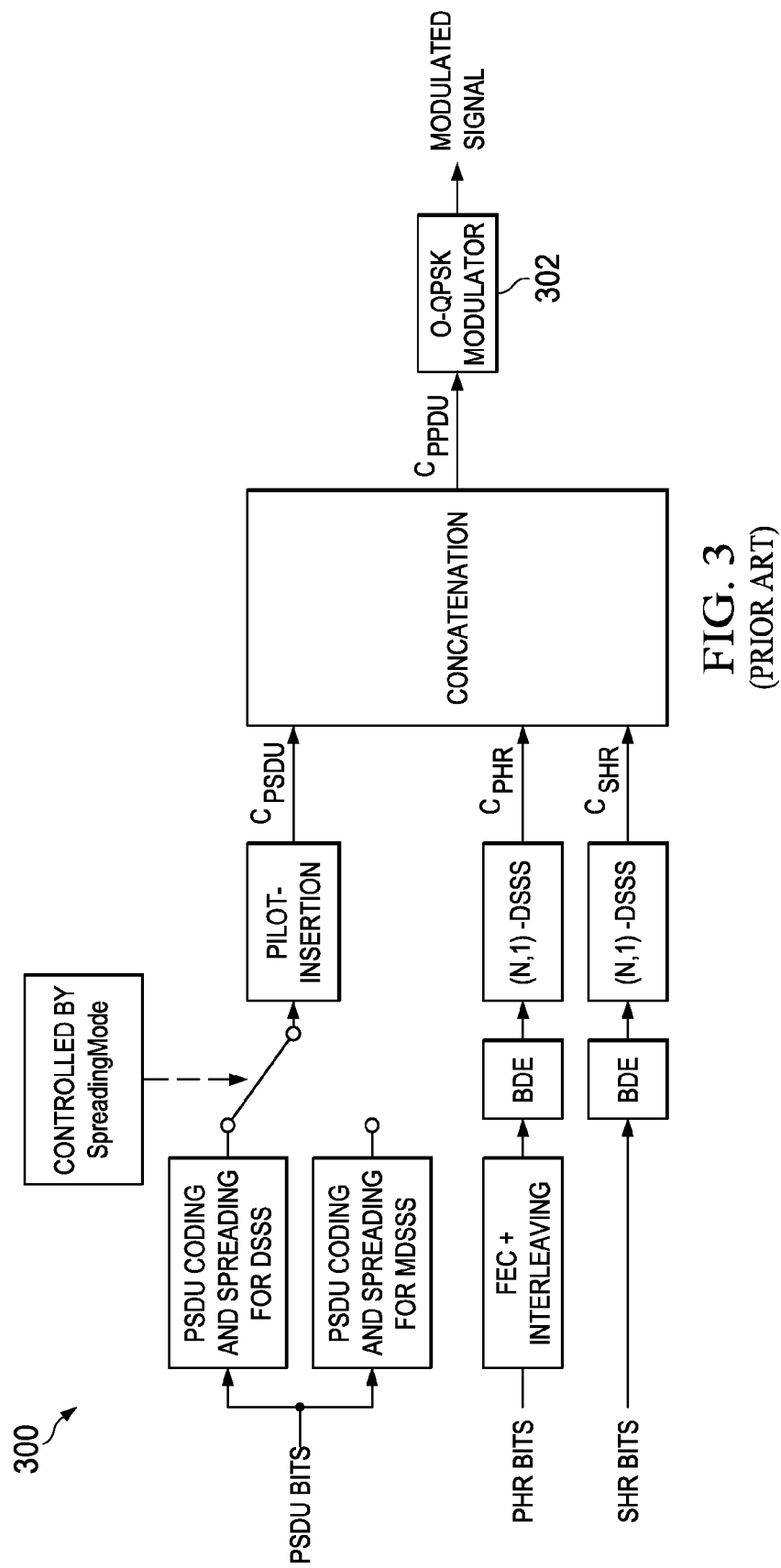
FIG. 3 is a block diagram of an 802.15.4 g standardized transmitter for DSSS packets.

FIG. 3 is a block diagram of a standardized transmitter 300 for DSSS packets, as defined by the IEEE 802.15.4 g specification. The chip timing for O-QPSK modulator 302 is shown in FIG. 2. The in-phase (I) and quadrature (Q) chips are offset in time by $T_C$, and 2 $T_C$ is the duration in time of each chip. For the 902-928 MHz band, the O-QPSK pulse shape is given as the half-sine pulse shape defined by equation (1).

$$p(t) = \begin{cases} \sin\frac{\pi t}{2T}, & \text{for } 0 \leq t \leq 2T_c \\ 0, & \text{otherwise} \end{cases} \quad (1)$$

PHY header 120 consists of twenty-four bits as is shown in Table 2.

TABLE 2

PHY header

| Bit string index | 0 | 1 | 2 | 3 | 4 | 5-15 | 16-23 |
|---|---|---|---|---|---|---|---|
| Bit mapping Field name | SM Spreading Mode | RM1 Rate | RM0 Mode | R1 Reserved | R0 | L10-L0 Frame Length | H7-H0 HCS |

The spreading mode (SM) field is set to 0 when DSSS is used for PSDU spreading. There are four rate modes for DSSS. Rate Mode 0 has a spreading factor of 16 and a data rate of 31.25 kb/s. Rate Mode 1 has a spreading factor of 4 (which is implemented with a (16,4) spreading code) and a data rate of 125 kb/s. Rate Mode 2 has a spreading factor of 2 (which is implemented with a (8,4) spreading code) and a data rate of 250 kb/s. Rate Mode 3 does not use spreading and has a data rate of 500 kb/s. For all rate modes the PSDU is coded with a rate 1/2, k=7 convolutional code.

The reserved bits are set to 0, and these may be used later to allow future evolution of the standard. The frame length is the length of the PSDU in octets, so the PSDU can contain up to 2047 octets (bytes). The header check sequence is an 8-bit CRC check for the header.

Referring again to FIG. 1, for the 902-928 MHz band, for example, SHR 110 contains the 56 "all 0" preamble bits 112 and the sixteen SFD bits 114. The SFD has a sixteen bit sequence, which is as follows: 1 1 1 0 1 0 1 1 0 1 1 0 0 0 1 0. Bit differential encoding (BDE) is applied to the SHR. In BDE, if the previous differentially encoded bit is 0 the current bit is unchanged and if the previous differentially encoded bit is 1 the current bit is inverted. The preamble is not affected by BDE since the "0" bits remain "0" bits after differentially encoding with the previous bit. Then a 64-chip spreading is applied to the SHR, as illustrated at 112-1, 112-2, for example.

The PHR includes the 24 bits defined in Table 1 to which six tail bits are appended, and then forward error correction (FEC) with a rate 1/2, k=7 convolutional code is applied, followed by an interleaver. Then a length 16 spreading code is applied. For the even-numbered bits a "0" maps to the chip sequence "0010 0011 1101 0110" and a "1" maps to "1101 1100 0010 1001". For the odd-numbered bits a "0" maps to "0100 0111 1010 1100" and a "1" maps to "1011 1000 0101 0011." This means that instead of the normal use of one spreading code there are two spreading codes that are alternated for each bit.

For the PSDU, six tails bits are appended and then possibly some pad bits so that the interleaver has an integer number of blocks to process. Then, the same rate 1/2, k=7 convolutional code is applied as was done for the PHR. After interleaving, there are four possible rate modes that may be used. Rate mode 0 is the same spreading as is used for the PHR. Rate mode 1 uses (16,4) spreading, so that for each 4 input bits there are 16 chips that are generated. The mapping is shown in the table 3. Rate mode 2 uses (8,4) spreading, so that for each 4 input bits there are 8 chips that are generated. The mapping is shown in the table 4. For Rate mode 3 there is no spreading.

TABLE 3

Rate mode 1

| Input bits (b0 b1 b2 b3) | Chip values (c0 c1 . . . c15) |
|---|---|
| 0000 | 0011 1110 0010 0101 |
| 1000 | 0100 1111 1000 1001 |
| 0100 | 0101 0011 1110 0010 |
| 1100 | 1001 0100 1111 1000 |
| 0010 | 0010 0101 0011 1110 |
| 1010 | 1000 1001 0100 1111 |
| 0110 | 1110 0010 0101 0011 |
| 1110 | 1111 1000 1001 0100 |
| 0001 | 0110 1011 0111 0000 |
| 1001 | 0001 1010 1101 1100 |
| 0101 | 0000 0110 1011 0111 |
| 1101 | 1100 0001 1010 1101 |
| 0011 | 0111 0000 0110 1011 |
| 1011 | 1101 1100 0001 1010 |
| 0111 | 1011 0111 0000 0110 |
| 1111 | 1010 1101 1100 0001 |

TABLE 4

Rate mode 2

| Input bits (b0 b1 b2 b3) | Chip values (c0 c1 . . . c7) |
|---|---|
| 0000 | 0000 0001 |
| 1000 | 1101 0000 |
| 0100 | 0110 1000 |
| 1100 | 1011 1001 |
| 0010 | 1110 0101 |
| 1010 | 0011 0100 |
| 0110 | 1000 1100 |
| 1110 | 0101 1101 |
| 0001 | 1010 0010 |
| 1001 | 0111 0011 |
| 0101 | 1100 1011 |
| 1101 | 0001 1010 |
| 0011 | 0100 0110 |
| 1011 | 1001 0111 |
| 0111 | 0010 1111 |
| 1111 | 1111 1110 |

Effect of Frequency Offset

As an example, for the 902-928 MHz band the DSSS chip rate is 1 Mchip/s and the preamble has 56 repetitions of the same 64 chip sequence. Each repetition occupies 64 microseconds, and the maximum carrier frequency offset allowed under the 802.15.4 g standard is 40 ppm or 37120 Hz at 928 MHz. Therefore, the phase rotation due to the carrier frequency offset can be as much as 2.375 cycles during one preamble sequence or repetition. Phase rotation is one factor that may hamper preamble detection in prior systems.

Properties of Preamble Sequence

The DSSS preamble sequence resulting from the 64 chip spreading factor is set out in Table 5 and is repeated for each of the DSSS preamble bits, such as the 56 preamble bits in preamble 112.

TABLE 5

DSSS preamble sequence 1011 0010 0010 0101 1011 0001 1101 0000 1101 0111 0011 1101 1111 0000 0010 1010

There are an equal number of "0" values and "1" values. During modulation, a "0" maps to −1, and a "1" maps to +1.

Figure 4:
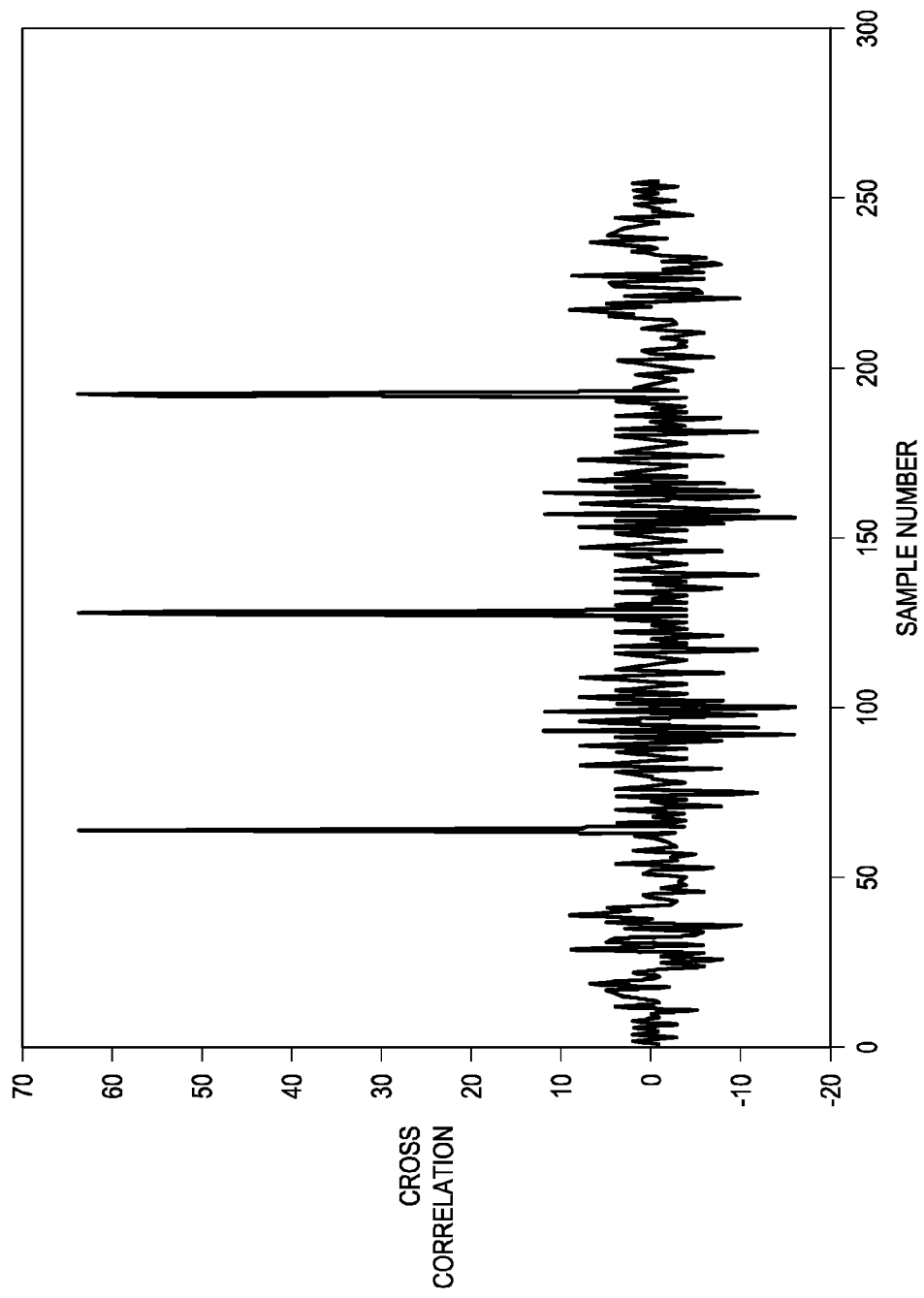
FIG. 4 is a plot illustrating cross correlation of a DSSS preamble with three repetitions of the preamble sequence.

FIG. 4 illustrates cross correlation of a DSSS preamble with three repetitions of the preamble. The cross correlation essentially "slides" the DSSS preamble sequence across the three repetitions and then counts the number of chip matches at each sample position. At each sample position, a match between two chips is counted as +1 and a miss is counted as −1. When the preamble is aligned, the value is +64, which is the expected value since there are 64 chips in each bit repetition and in this case there is no rotation or noise interference. The maximum side peaks are +12 and −16. This results from random matches of chips during each correlation.

Figure 5:
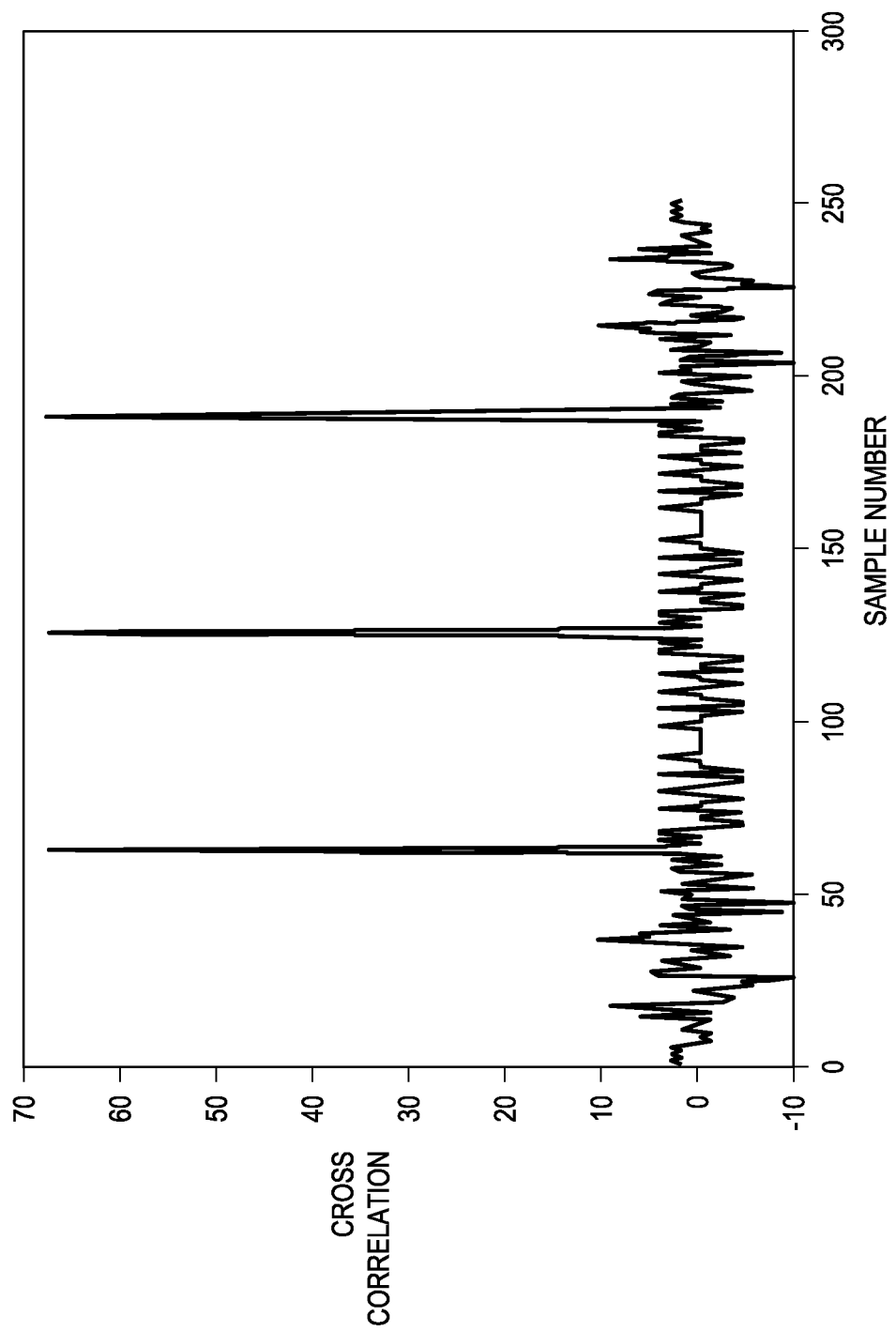
FIG. 5 is a plot illustrating cross correlation of a DSSS preamble differential sequence with three repetitions of the preamble differential sequence.

FIG. 5 illustrates cross correlation of a DSSS preamble differential sequence with three repetitions of the preamble differential sequence. The differential sequence is calculated by finding the phase difference from one chip to the next by multiplying the complex conjugate of the previous reference chip with the value of the current chip. When the preamble is aligned the value is +64, and the maximum side peaks are +3 and −5 for the center repetition. The cross-correlation values for the differential sequence produce lower side peaks than the original preamble sequence; therefore, the differential sequence may provide better preamble detection in the presence of noise and/or multipath interference.

Figure 6:
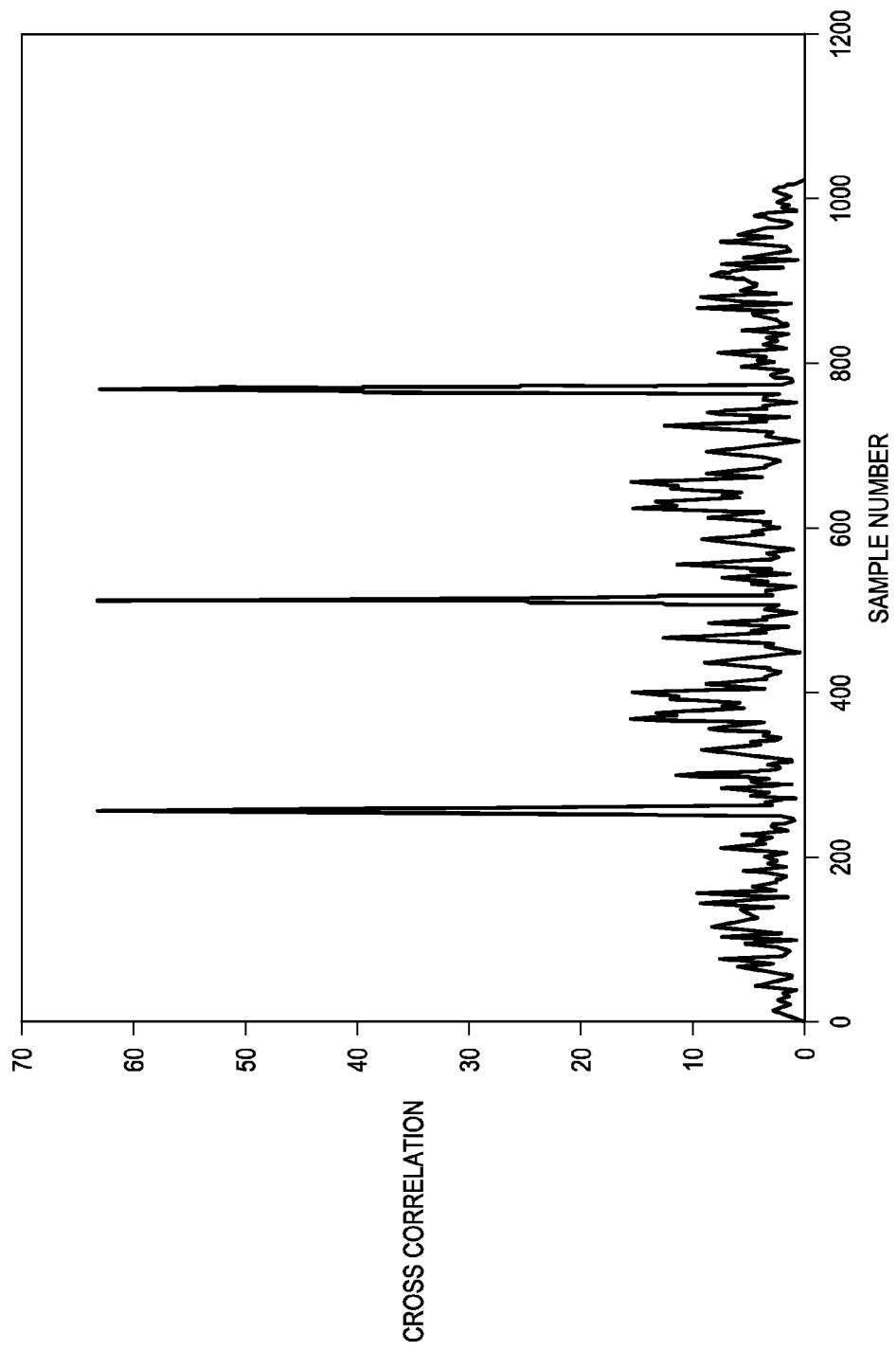
FIG. 6 is a plot illustrating cross correlation of a DSSS preamble with three repetitions of the preamble sequence in which the O-QPSK signal is oversampled by 4×.

FIG. 6 illustrates cross correlation of a DSSS preamble with three repetitions of the preamble in which the received O-QPSK signal is oversampled by 4×, rather than first demodulating the received signal. In this case, the received signal is sampled at a 4× rate, then the correlation is computed and the absolute value taken. The maximum correlation is again 64, and the maximum absolute value of the largest sidelobe is 15.6.

Figure 7:
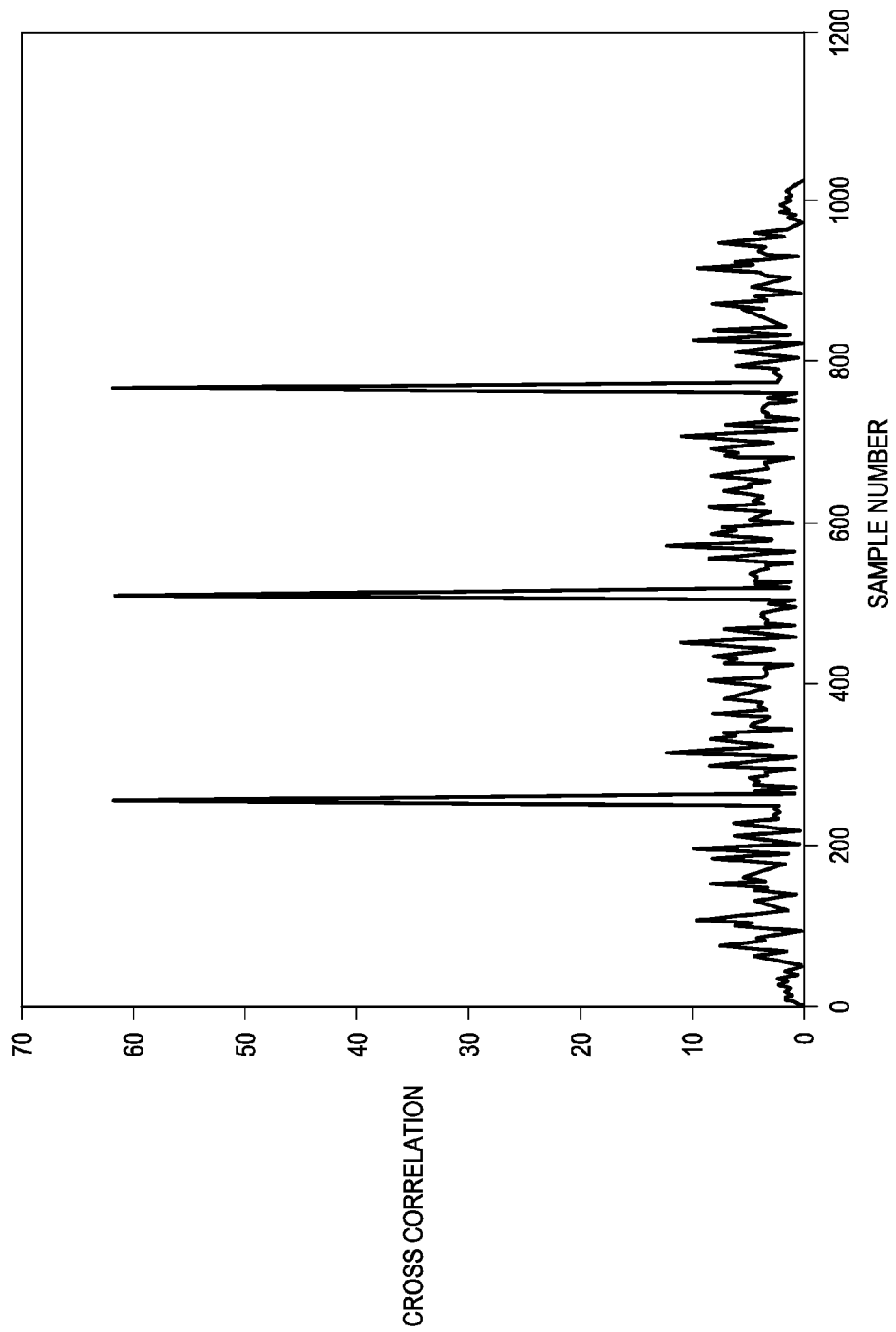
FIG. 7 is a plot illustrating cross correlation of a DSSS preamble differential sequence with three repetitions of the preamble differential sequence in which the O-QPSK signal is oversampled by 4×.

FIG. 7 illustrates cross correlation of a DSSS preamble differential sequence with three repetitions of the preamble differential sequence in which the O-QPSK signal is oversampled by 4×. Again, the correlation is computed and the absolute value taken. The maximum correlation is again 64, and the maximum absolute value of the largest sidelobe is 12.7.

DSSS Preamble Detection Algorithm

The worst case for preamble detection is Rate Mode 0 with a spreading factor of 16 for the data bits, and it should operate at about −12 dB Ec/N0, which is the abbreviation for received Energy per Chip/noise power density in the band. Direct correlation with the preamble sequence may not be effective because the carrier frequency offset can cause a rotation of more than two cycles within one preamble word of 64 chips. When a phase differential chip correlation is performed, the maximum rotation from one chip to the next is 0.037 cycles or 13 degrees. Thus, using a differential chip correlation may significantly improve preamble detection performance in the presence of frequency rotation, noise, and multipath effects. The basic steps of differential chip correlation for an example embodiment at a chip rate of 1 Mchip/s are as follows:

1) At 4× oversampling (4 Msps), perform O-QPSK demodulation and differential chip detection for all four possible timing phases. Then, the chip estimates are calculated at 1 Mchip/s for the four timing phases;

2) Take the sign bit of the differential chip estimates, so all the values will be +/−1. This allows the preamble detection algorithm to work even if the AGC (automatic gain control) is changing gain values;

3) Accumulate the differential chip estimates over 40 preamble words in groups of eight words. Thus, when eight new words are accumulated the oldest eight words can be discarded. The receiver may to keep in memory five groups of differential chip estimates for each of the four phases of timing estimates. In this embodiment, each group contains 64 values with each value being the sum of eight differential chip estimates; and 4) Cyclically correlate the differential chip estimates with the length 64 differential preamble word in the frequency domain. If the value of any of the 64 correlations is above the threshold, then the DSSS preamble is found and the best timing corresponds to the peak correlation location.

FIG. 8 is a flow diagram illustrating detection of DSSS preambles using differential sequences. In this embodiment, the DSSS signal is received 802 and is sampled at 4× the chip rate to produce a sequence of samples 804. Since the samples represent a complex value for the I and Q portion, they have the form (I+jQ). This produces four timing phases which can be termed $timing_1$, $timing_2$, $timing_3$, and $timing_4$. The symbol timing for $timing_2$ is delayed by 1 sample with respect to the symbol timing for $timing_1$, for example. In FIG. 8, processing of phase $timing_1$ 811-813 and $timing_4$ 841-843 are illustrated, but the other two phases are treated in a similar manner.

For each timing phase, the receiver performs O-QPSK demodulation 806 and calculates 811, 841 the differential chip values for each phase. In this embodiment, the O-QPSK demodulation is performed first by multiplying the received samples by the discrete values of the half-sine pulse shape as illustrated in equation (1); however, in other embodiments, O-QPSK demodulation may be performed using other known or later developed techniques.

For example, with 2× oversampling, the pulse shape can be represented by the values of [0.7071, 1.000, and 0.7071]. With 4× oversampling, the pulse shape can be represented by [0.3827, 0.7071, 0.9239, 1.0000, 0.9239, 0.7071, and 0.3827].

Alternatively, these values can be calculated with a half-sample delay so that the pulse shape is represented by [0.3827, 0.9239, 0.9239, and 0.3827] for 2× oversampling or [0.1951, 0.5556, 0.8315, 0.9808, 0.9808, 0.8315, 0.5556, and 0.1951] for 4× oversampling. Of course, other delay times and corresponding sample values could be used.

Differential chip detection can be performed by multiplying the conjugate of the previous chip estimate by the current chip estimate. Quantization to 1 bit for I and 1 bit for Q may be done to lower computational complexity and to minimize the effect of automatic gain control (AGC) gain changes during the preamble. A complex conjugate is formed by negating the imaginary part of the complex number. The conjugate of x+jy is x−jy, where x and y are real numbers. Complex conjugate multiplication may be used to form the differential sequence in order to focus on the phase difference between the adjacent pairs of I,Q samples.

In another embodiment, when multiplying by the conjugate of the previous O-QPSK symbol to calculate the differential chip values, the conjugate multiplication may be done before the O-QPSK demodulation. In this case, O-QSPK demodulation of the preamble portion of the packet does not need to be performed.

For each of the four timing phases there should be 64 differential chip estimates per preamble repetition. These differential chip estimates are accumulated 812, 842 over about 40 preamble repetitions. Then, correlation 813, 843 with the known transmitted differential chip sequence can be performed, either in the frequency domain or in the time domain. After correlation, each sample position result may be compared to a threshold value and when the threshold value is exceeded then that indicates a preamble location has been detected. The number of known preamble repetitions used during the correlation may be selected to balance accuracy of detection against computational load. For example, using only one repetition, as illustrated in FIGS. 5-7 results in a maximum correlation value of 64. Using 40 repetitions increases the maximum correlation value to 2560. The threshold value may be selected based on the number of repetitions of the known preamble used during the correlation. This threshold can typically be set in the range of 100 to 1000 depending on the lowest SNR where the receiver can successfully receive a packet. Also the absolute value of the metric is typically taken before comparing to the threshold.

FIG. 9 is a flow diagram illustrating performance of correlation 813, 843 in the frequency domain for one of the timing phases. In this example, a FFT (fast Fourier Transform) is performed 953 on the accumulated sequence 812 of differential chip estimates 811. The result is then multiplied 954 by the FFT of the known transmitted differential chip sequence. The inverse FFT (IFFT) 955 of the result is then taken. Each resultant value is then compared 956 to a threshold value and a preamble location is detected when the threshold value is exceeded.

In this embodiment, a 4× oversampling was performed and all four timing phases were used. The four results are compared. By using all possible timing phases it is more likely to successfully detect a DSSS preamble. The best timing phase can also be used in the receiver to set the chip timing for the packet. In another embodiment, a 2× oversampling is performed and only one timing phase is used in order to minimize computations. Alternative embodiments may include oversampling factors that are different from two or four, such as three, six, or eight, for example. Various numbers of timing phases may be used in a tradeoff between computation load and overall accuracy of preamble detection.

The differential phase correlations may be performed with one larger FFT and IFFT rather than separating the computations into different timing phases.

There can be a different number of positions than 64 since the spreading factor can be different than 64 in the various bands and modes supported by 802.15.4 g.

The number of repetitions to accumulate may be varied from 40 since there are 56 repetitions of the preamble word. Using a large number of repetitions may marginally improve accuracy of detection, while using a smaller number of repetitions may reduce computation effort. In general, at least eight repetitions should be used, up to the maximum of 56 repetitions.

In another embodiment, correlations 813, 843 may be performed in the time domain rather than the frequency domain by performing a convolution of the known preamble differential chip sequence with the sequence of differential chip values, as defined in equation (2). A convolution is defined as the integral of the product of the two functions after one is reversed and shifted. As such, it is a particular kind of integral transform.

$$(f*g)(t) = \int_{-\infty}^{\infty} f(\tau)g(t-\tau)d\tau \quad (2)$$

where:
f(t) is the sequence of differential chip values,
g(t) is the known preamble differential chip sequence.

In either a time domain or frequency domain embodiment, the receiver does not need to quantize to 1 bit for 1 and Q, but can use more bits or full precision in order to provide a higher level of accuracy in preamble detection.

In another embodiment, the receiver may perform direct correlation with the preamble sequence rather than finding differential chip values. In this case, the correlation may be performed in either the frequency domain or in the time domain, as described above.

DSSS Detection Simulations

FIG. 10-13 are plots illustrating simulation results of an example embodiment in which 2× over sampling was performed and only one timing phase was used. Although the DSSS preamble has 56 repetitions of 64 chips for a total of 3584 is in the 1000 kchip/s options, only 40 repetitions or 2560 μs is are used for DSSS preamble detection in this embodiment. This allows time to recover the carrier frequency after preamble detection. Simulations were run for Ec/N0=0 dB, −10 dB and −12 dB with the lowest Ec/No corresponding to the Rate Mode 0 detection scenario.

Figure 10:
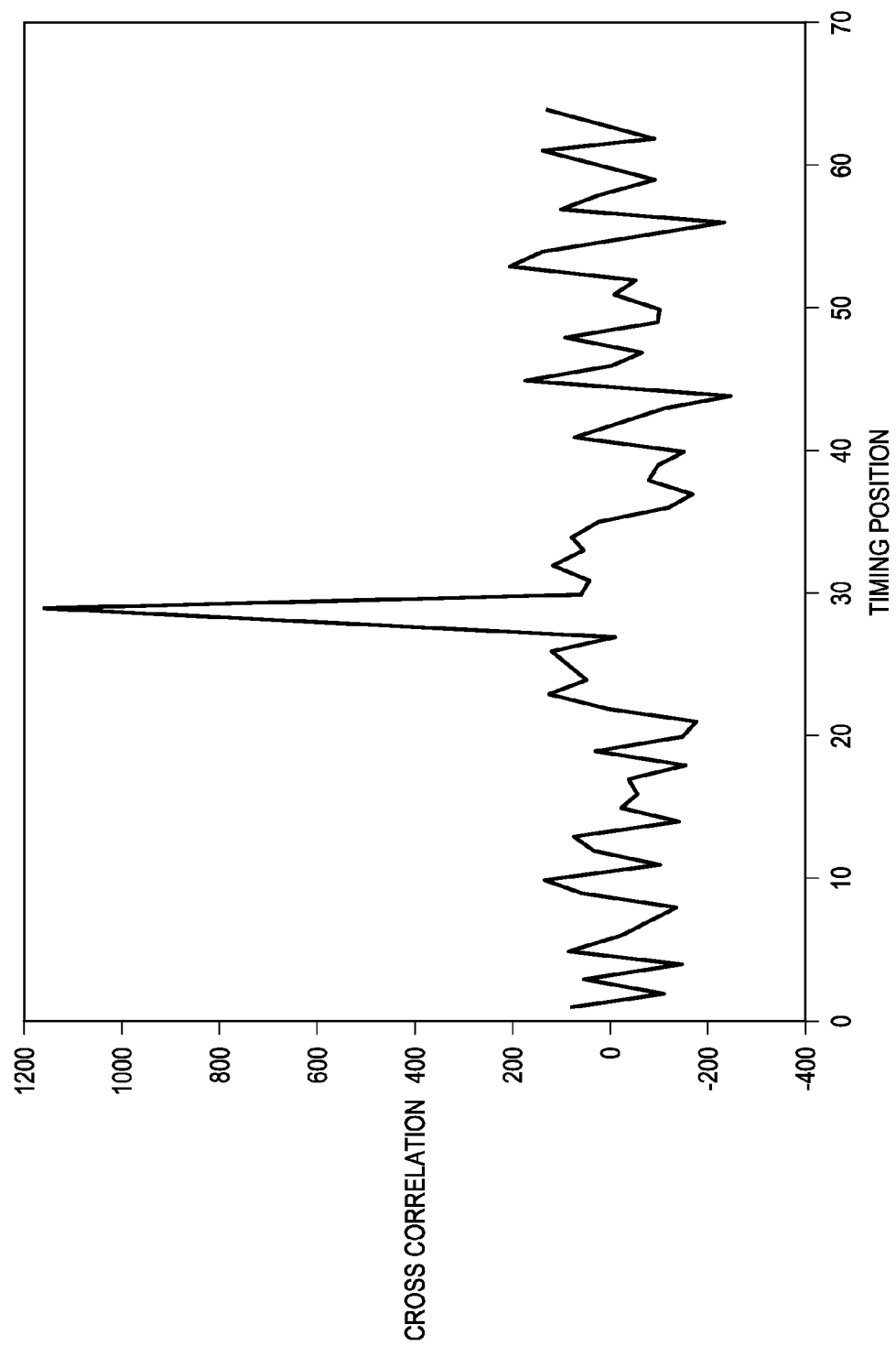
FIG. 10-13 are plots illustrating simulation results.

FIG. 10 shows the correlation output for Ec/No=0 dB, which can correspond to Rate Mode 3. The best timing corresponds to position 28 in these simulations. The maximum theoretical value is 2560, since this embodiment uses 40 repetitions, which occurs if there are no chip errors due to frequency rotation, noise, multipath, etc.

Figure 11:
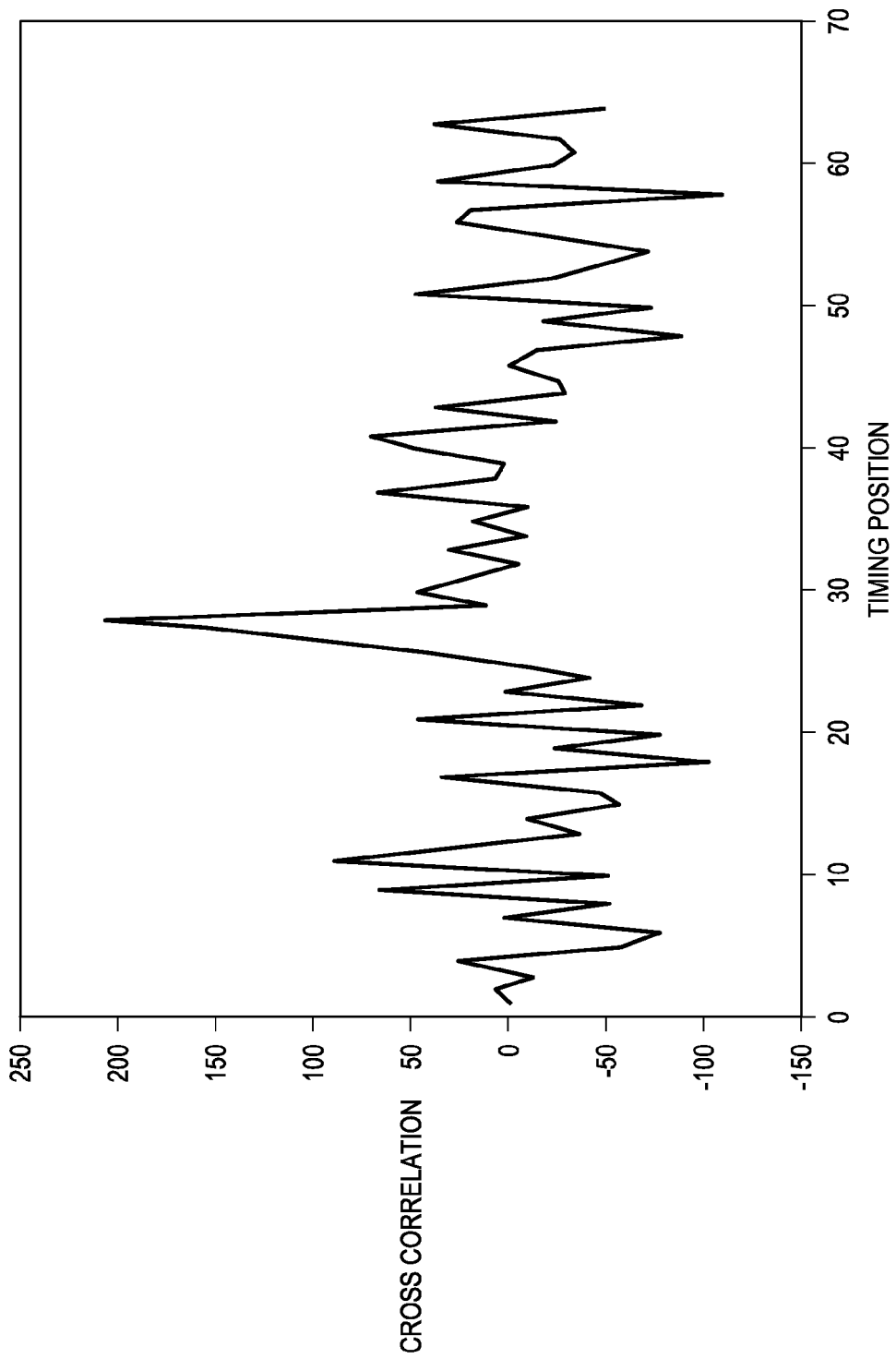

FIG. 11 shows the correlation output for Ec/No=−10 dB.

Figure 12:
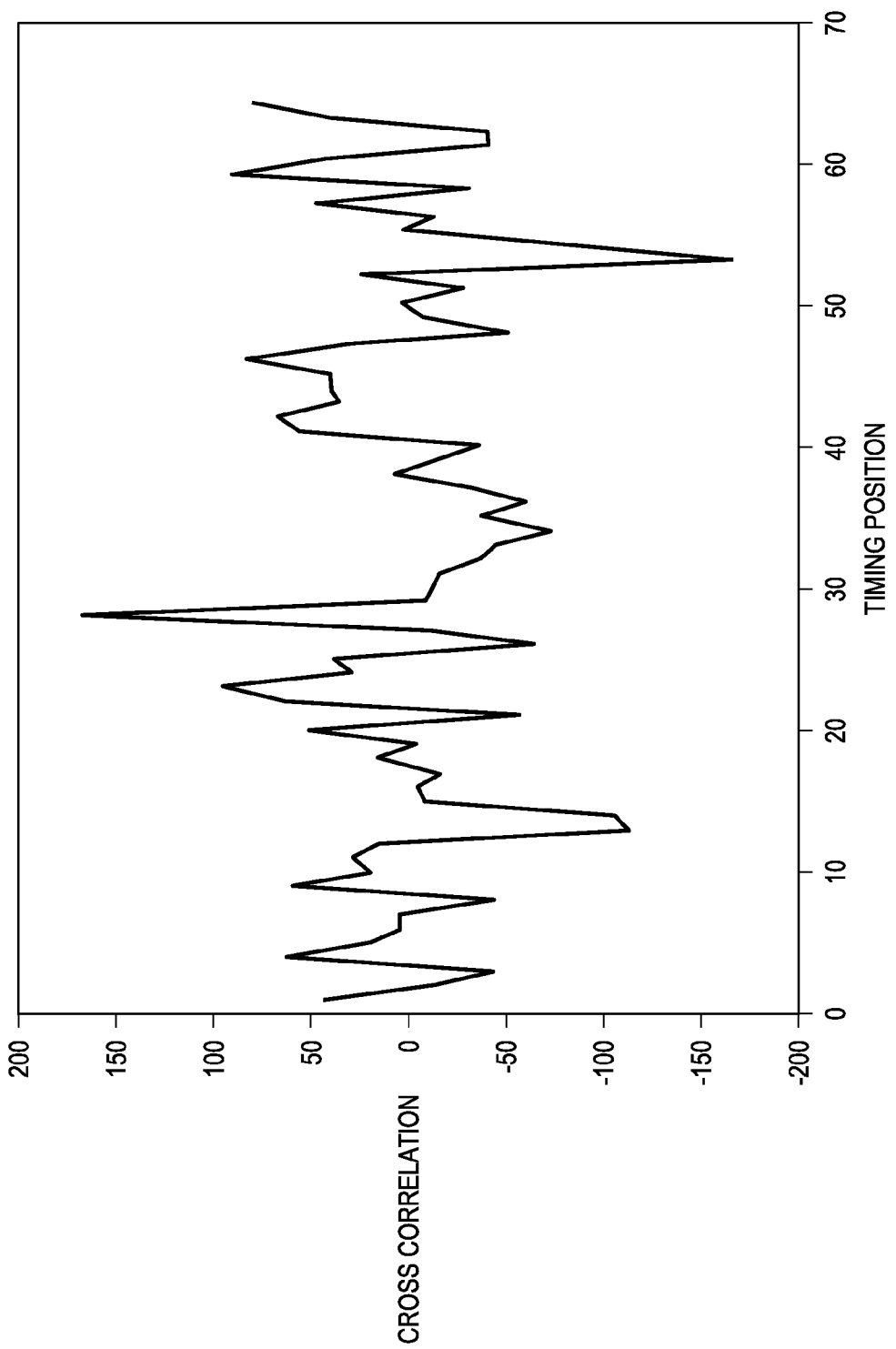

FIG. 12 shows the correlation output for Ec/No=−12 dB.

Effect of Multipath on DSSS Detection

In the previous FIGS. 10-12, the simulations were done with an AWGN channel. Additive white Gaussian noise (AWGN) is a channel model in which the only impairment to communication is a linear addition of wideband or white noise with a constant spectral density (expressed as watts per hertz of bandwidth) and a Gaussian distribution of amplitude. The model does not account for fading, frequency selectivity, interference, nonlinearity, or dispersion. However, it produces simple and tractable mathematical models which are useful for gaining insight into the underlying behavior of a system before these other phenomena are considered.

Figure 13:
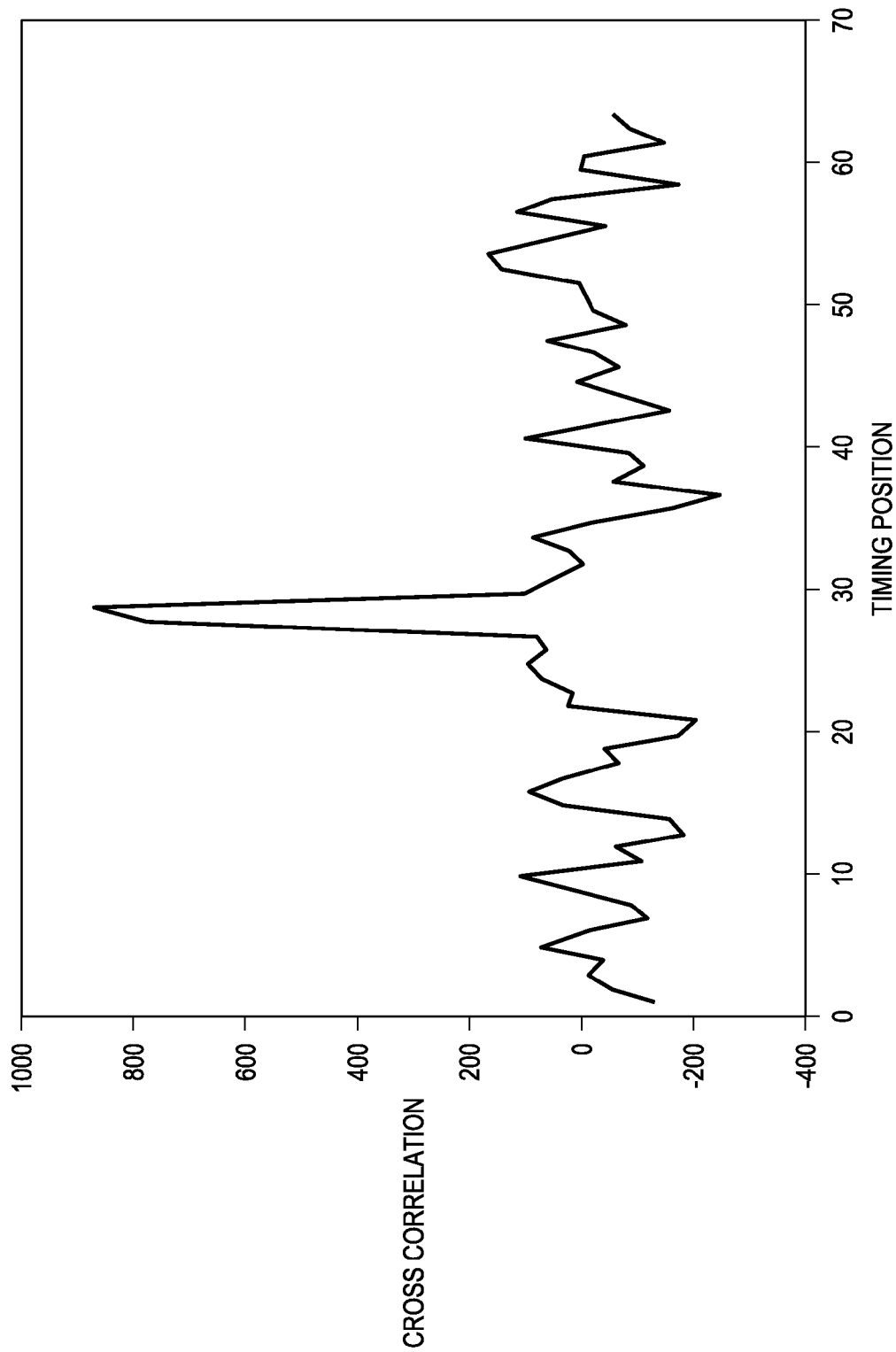

FIG. 13 is a simulation that uses a Pedestrian B channel model at Ec/N0=0 dB. Various models of multipath interference have been developed, such as pedestrian A, pedestrian B, vehicular A, typical urban, etc. Various models may be downloaded from Matlab, for example.

Figure 14:
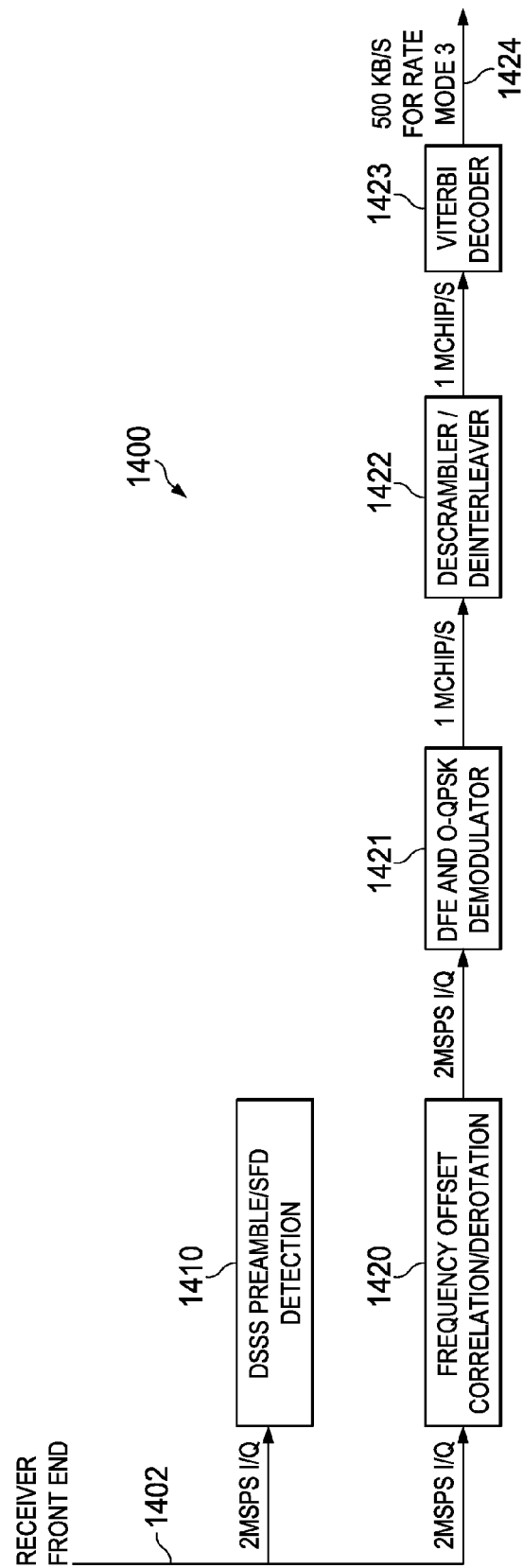
FIG. 14 is a block diagram of an example receiver for use in a SUN.

FIG. 14 is a block diagram of an example receiver 1400 for use in a SUN that performs preamble detection as described herein. A radio frequency (RF) front end and antenna receive a DSSS signal 1402. DSSS preamble detection 1410 is performed as described in more detail above. Once a packet preamble is detected, then each packet is decoded as illustrated in the bottom path 1420-1424 of the receiver. Frequency offset correction/derotation 1420 is performed, then DFE and O-QPSK demodulation 1421 is performed, then descrambling/deinterleaving 1422 is performed, and finally Viterbi decoding is performed to produce a data payload 1424 that was transmitted via the wireless DSSS signal. The various operations 1420-1423 may be performed using well known or later developed techniques for receiving and decoding DSSS signals.

System Example

Figure 15:
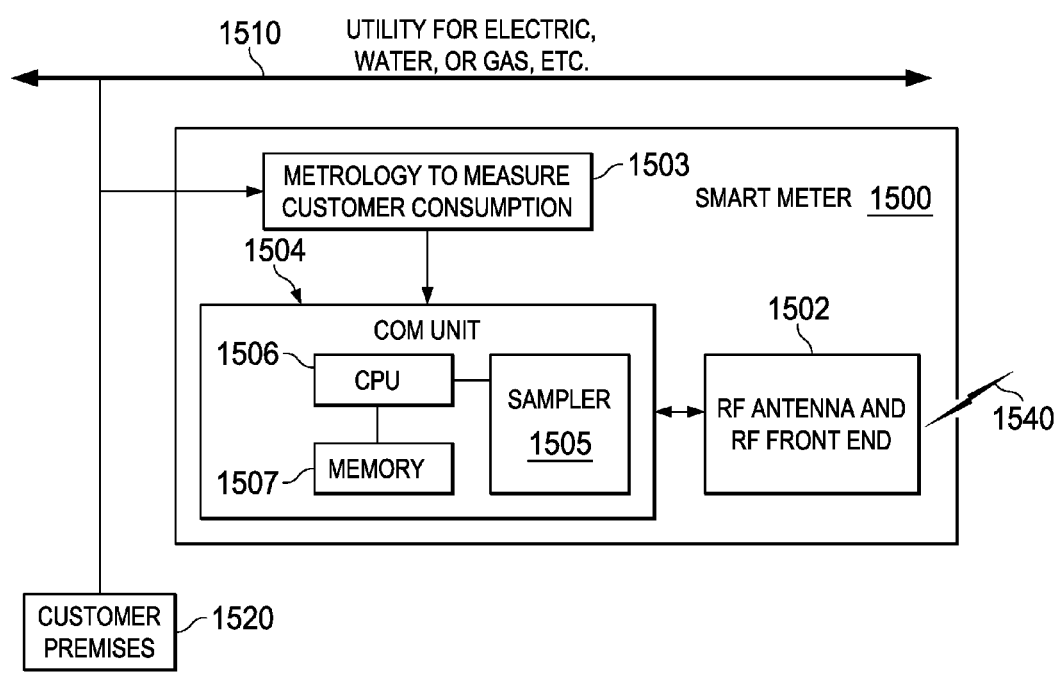
FIG. 15 is a block diagram of an example smart meter.

FIG. 15 is a block diagram of a smart meter 1500 that utilizes Viterbi decoding for communication via radio frequency. A utility line 1510 provides a resource such as electric, water, or gas, for example, to a customer premise 1520. Customer premise 1520 may be a home, a business, or a factory, for example. Smart meter 1500 may be coupled to the utility connection at the point of entry to the customer premise in order to monitor and measure an amount of utility 1510 resource consumed by customer premise 1520.

Metrology device 1503 monitors the consumption of utility resource. For example, the utility may be an electric utility and the smart meter measures the amount of electrical power consumed, typically in units of kilowatt hours of energy. In another example, the utility may be a gas utility, and the smart meter measures the amount of gas consumed in units of cubic feet of gas. Metrology device 1503 uses well known or later developed techniques to measure the amount of utility resource that is consumed and to provide that measure to communication unit 1504.

Communication unit 1504 may be configured to periodically transmit consumption information via RF front end and antenna 1502 to a collection node in a smart utility network (SUN) on a periodic basis. For example, communication unit 1504 may report consumption data every 15 minutes. In this embodiment, RF front end 1502 is configured to send and receive wireless DSSS signals 1540. Communication unit 1504 may also receive commands from a controller in the SUN via wireless signal 1540.

These commands may be used by processor (CPU) 1506 to provide information that has been gathered by metrology device 1503, such as: status of the utility resource, such as electric voltage level, gas or water pressure level, etc; total amount of utility usage over a period of time; environmental data such as ambient temperature; etc. These commands may also be used by processor 1506 to cause the customer premise to reduce usage of the utility resource or to resume normal usage of the utility resource, for example. Additional components, not shown, may be required to alter the usage of the utility resource in response to commands received by communication unit 1500 via the DSSS signal 1540. These additional components may be located within customer premise 1520 and may include: a disconnect switch, a pressure regulator, a cutoff valve, etc.

Communication unit 1504 can process the filtered signal that it receives from radio frequency front end 1502. Sampler 1505 is configured to select the input samples that are recovered during a demodulation process that correspond to noise encumbered convolutionaly encoded data that is being received via the communication channel 1540. The sampler 1505 can be any one of various types of samplers, such as an analog to digital converter or the like. As the sampler 1505 provides the sampled signal, CPU 1506 receives this signal and may use resources within CPU 1506 to execute instructions fetched from a memory device 1507 to perform DSSS preamble detection as described in more detail above. Once the location of a packet preamble is located, then the processor may execute instructions fetched from memory 1507 to perform Viterbi decoding of the received signal and thereby recover the original data payload, such as contained in PSDU 130 in FIG. 1. Once decoded, the processor may then use the received information to perform control operations within the smart meter.

Communication unit 1504 may also collect status information relating to operation of the smart meter or other appliances or control modules connected to the smart meter. It may then perform convolution encoding according to the 802.15.4 g standard and transmit the encoded status information via radio frequency front end 1502, which may then transmit the encoded status information to a remote data collection system via wireless communication channel 1540.

Other wired interfaces may also be provided, such as SPI (serial peripheral interface), UART, (universal asynchronous receiver/transmitter), universal serial bus (ESB) or the like, that may be coupled to communication unit 1504 to allow an onsite technician to access the smart meter, for example.

Other Embodiments

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation For example, while the characteristics of the 902-928 MHz band have been described herein in some detail, embodiments of the invention may operate on other bands defined for use by IEEE 802.15.4 g, such as the 470-510 MHz band, the 779-787 MHz band, the 863-870 MHz band, and the 2400-2483.5 MHz band, for example. In each case, the timing and bit counts may differ from that described for the 902-928 MHz band, but the same general methods described herein may be used to detect the presence of the preamble pattern in a low complexity manner.

Other embodiments may be directed to detection of a repeated pattern of bits in other communication protocols that use O-QPSK modulation, or other types of digital modulation such as BPSK, QPSK, or quadrature amplitude modulation.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for detecting a preamble in a direct sequence spread spectrum (DSSS) signal by a receiver, the method comprising:
   receiving the DSSS signal by the receiver,
   four times oversampling the received DSSS signal;
   O-QPSK (offset-quadrature phase shift keying) demodulating the oversampled received DSSS signal;
   forming a sign bit of a digital sequence of samples representative of the demodulated DSSS signal;
   calculating a difference value between pairs of samples in the digital sequence of samples to accumulate an extended sequence of differential values;
   correlating a known preamble differential value sequence with the accumulated extended sequence of differential values to form a sequence of correlation values; and
   identifying a location of the preamble in the digital sequence of samples corresponding to a peak in the sequence of correlation values that exceeds a threshold value and that identifies the preamble.

2. The method of claim 1, wherein correlating is performed by:
   calculating a first Fast Fourier Transform (FFT) of the extended sequence of differential values;
   multiplying the first FFT by a second FFT of the preamble differential value sequence to form a product; and
   determining an inverse FFT (IFFT) of the product.

3. The method of claim 1, in which forming the extended sequence of differential values includes accumulating an extended sequence of differential values having a length corresponding to N repetitions of the known preamble differential value sequence; wherein N has a value of at least 8.

4. The method of claim 1, wherein correlating is performed by:
   performing a convolution of the extended sequence of differential values with the known preamble differential value sequence.

5. The method of claim 1, in which forming the extended sequence of differential values includes accumulating an extended sequence of differential values having a length corresponding to N repetitions of the known preamble differential value sequence; wherein N has a value within a range of 8 to 56.

6. The method of claim 1, further comprising demodulating the DSSS signal prior to forming the digital sequence of samples, such that the digital sequence of samples form a sequence of chips.

7. The method of claim 1, wherein calculating a difference value between pairs of samples is performed by multiplying a first sample of the pair of samples by a conjugate of a second sample of the pair of samples.

8. The method of claim 1, wherein the forming forms a plurality of digital sequences corresponding to a plurality of chip phase samples; wherein the calculating a difference value, correlating a known preamble differential value sequence and identifying a location of a preamble are performed on each of the plurality of digital sequences; and further comprising selecting an identified preamble location in the digital sequence having the highest correlation value from the plurality of digital sequences.

9. The method of claim 1, wherein the digital sequence of samples is formed using a sampling rate of approximately two times a chip rate of the DSSS signal.

10. The method of claim 1, wherein the digital sequence of samples representative of the DSSS signal comprise digital samples having a complex value, wherein each portion of the complex value is represented by a one bit quantization value.

11. A process of detecting a direct sequence spread spectrum (DSSS) preamble comprising:
    O-QPSK (offset-quadrature phase shift keying) demodulating a four times oversampled received wireless DSSS packet signal that includes a preamble:
    performing a differential chip detection in each of four timing phases at 1 Mchip/s for each phase;
    taking a sign bit of each of the differential chip estimates so all values will be +/−1;
    accumulating the differential chip estimates over 40 preamble words in groups of eight words;
    cyclically correlating the differential chip estimates with a 64 chip length of a differential preamble word in a frequency domain;
    comparing the correlations to a threshold; and
    finding the DSSS preamble when the value of any of the 64 correlations is above the threshold.

12. The process of claim 11 in which the accumulating discards the oldest eight words when eight new words are accumulated.

13. The process of claim 11 in which the accumulating includes keeping in memory five groups of differential chip estimates for each of the four phases of timing estimates, where each group contains 64 values with each value being a sum of eight differential chip estimates.

14. A smart utility meter comprising:
    metrology to measure consumption of the utility and having a metrology output;
    a radio frequency front end having an antenna, an input, and an output;
    a communications unit coupled to the metrology output and the radio frequency front end input and output, the communications unit including a sampler, a processor unit, and memory, the communications unit detecting a direct sequence spread spectrum (DSSS) preamble by:
    receiving wireless DSSS packet signals that includes a preamble;
    four times oversampling the received wireless signal;

O-QPSK demodulating the oversampled received wireless;
performing a differential chip detection in each of four timing phases at 1 Mchip/s for each phase;
taking a sign bit of each of the differential chip estimates so all values will be +/−1;
accumulating the differential chip estimates over 40 preamble words in groups of eight words;
cyclically correlating the differential chip estimates with a 64 chip length of a differential preamble word in a frequency domain;
comparing the correlations to a threshold; and
finding the DSSS preamble is when the value of any of the 64 correlations is above the threshold.

* * * * *